Patented Oct. 10, 1933

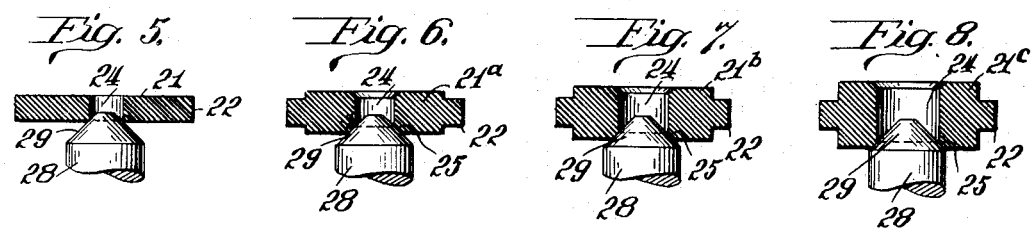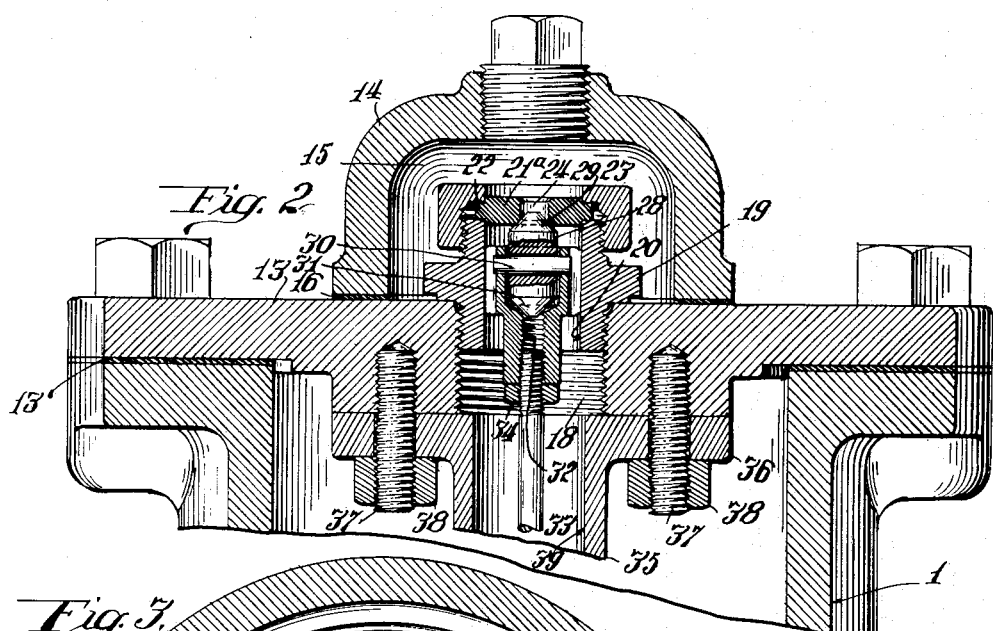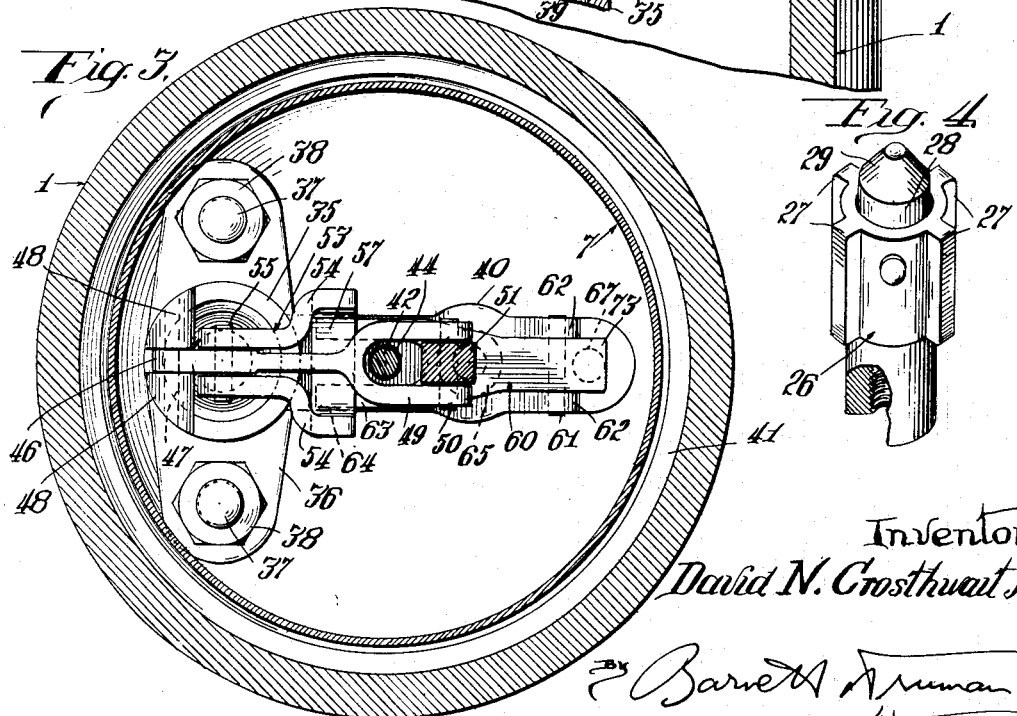

1,930,224

UNITED STATES PATENT OFFICE 1,930,224

BUCKET TRAP

David N. Crosthwait, Jr., Marshalltown, Iowa, assignor to C. A. Dunham Company, Marshalltown, Iowa, a corporation of Iowa Application April 11, 1931. Serial No. 529,413

5 Claims. (Cl. 236—53)

This invention relates to certain new and useful improvements in bucket traps of the type adapted to retain steam within an apparatus but allow water to be forced out at intervals. Such a trap is usually used with steam heating systems using steam at higher than atmospheric pressure, but the trap can also be used with steam at pressures less than atmospheric as long as the pressure within the trap is higher than the pressure against which the water is forced out through the discharge passage.

Air is present in some quantity in all steam heating equipment. In apparatus which uses steam under pressures exceeding atmospheric, the air finds its way into the equipment at such times as the system is shut down and the higher pressure is dissipated. Air also accumulates in the system due to the air or other non-condensable gases released from the solution in the boiler during the steam generating process. During the normal operation of the heating system, after the system has once been cleared of the accumulated air, the additional air produced will be vented through the traps at the time the accumulated condensate is forced out.

However, at the time the heating equipment is first put into operation after a period of disuse, the accumulated air will have a very material effect in reducing the efficiency of the equipment and increasing the time required for the equipment to heat up to normal capacity. In the usual type of bucket trap, sufficient water remains in the casing to buoy up the bucket and close the valve so that any air that remains in the system and is forced into the trap ahead of the steam is merely compressed in the casing of the trap. The compression of this air prevents the ready entrance of condensate, and this condensate accumulates within the heating apparatus and prevents the radiating system from functioning efficiently or rapidly. In some equipments a petcock or valve has been provided for manual operation so that the accumulated air could be vented to permit the condensate to enter the trap, after which this pet-cock is closed and the automatic operation of the trap will proceed satisfactorily.

According to the present invention a thermostatically controlled means is provided for holding the main valve of the trap open during the initial stages of operation of the system, and until steam has entered the trap casing, so that all of the accumulated air can readily be forced out. When steam enters the casing the thermostatic element will expand so as to be no longer operative for holding the valve open, after which the valve is under the sole control of the bucket as in the usual bucket trap.

The principal object of this invention is to provide an improved bucket trap of the type briefly described hereinabove and disclosed more in detail in the specifications which follow.

Another object is to provide an improved thermostatic air release for bucket traps.

Another object is to provide a simple unitary structure involving a single valve which is under the control of a thermostatic element at temperatures below steam temperature, and which is under the control of a float-operated element at temperatures above steam temperature.

Another object is to provide an improved bucket trap which does not require adjustment and can be operated under a plurality of maximum pressures with no change except the substitution of a valve seat of proper size.

Another object is to provide an improved thermostatic air release for bucket traps, using a simple and compact metallic thermostatic element.

Other objects and advantages of this invention will be more apparent from the following detailed description of certain approved forms of apparatus embodying the principles of this invention.

In the accompanying drawings:

Fig. 2 is a partial transverse vertical section, taken subtstantially on the line 2—2 of Fig. 1.

Fig. 3 is an inverted horizontal section taken substantially on the line 3—3 of Fig. 1.

Fig. 4 is a perspective view of the movable valve assembly.

Figs. 5, 6, 7 and 8 are similar vertical sections through a plurality of interchangeable valve seats.

Figure 1:
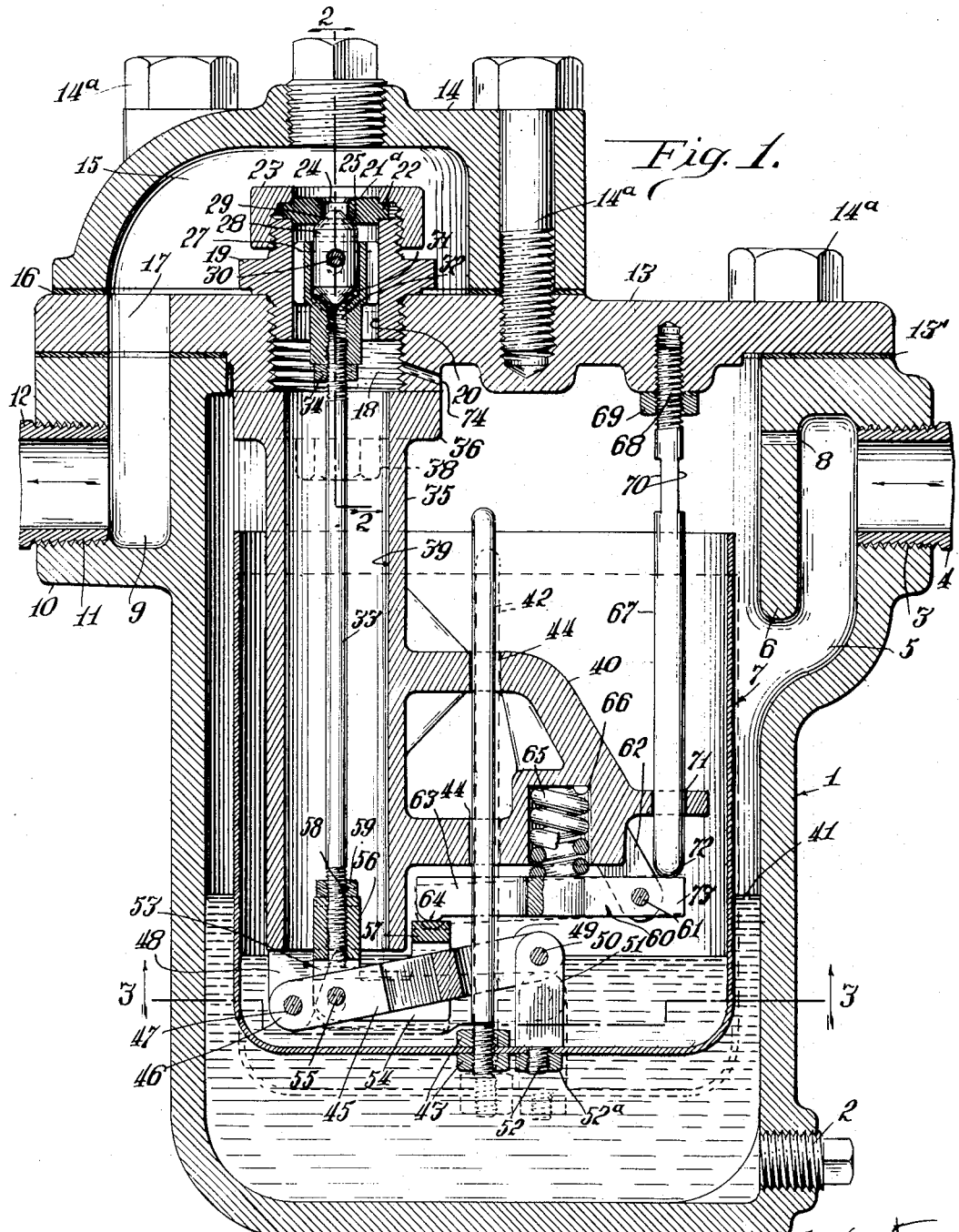
Fig. 1 is a central vertical section through one approved form of the apparatus.

Referring first to the form of such a trap shown in Figs. 1 to 8 inclusive, the main casing 1 is entirely closed in its lower portion except for a drain opening normally closed by the plug 2. In one side of casing 1 adjacent the top thereof is an inlet opening 3 in which is screwed the end 4 of the pipe leading from the heating system through which fluids are delivered into the trap. The inlet 4 communicates through passage 5 with the interior of the casing, the baffle 6 directing the liquid downwardly below the bucket 7. A passage 8 through baffle 6 permits the non-condensable gases to readily accumulate in the upper portion of the casing above the surface of the water therein. A discharge passage 9 is formed in an extension 10 near the upper edge of casing 1, a threaded passage 11 receiving the end of the discharge pipe 12.

A cover plate 13 closes the open top of casing 1, a gasket 13' being clamped between the closure 13 and the casing. A valve housing 14 containing valve chamber 15 is mounted above the cover plate 13, the joint between these members being sealed by a gasket 16. An opening 17 in cover plate 13 connects valve chamber 15 with the outlet passage 9. The closure plate 13 is secured to casing 1, and the valve housing 14 is secured to closure plate 13 by a plurality of screw bolts indicated generally at 14$^a$.

A threaded passage 18 extends downwardly through closure plate 13. A valve guide nut 19 having the central valve passage 20 has a lower threaded end screwed into the upper end of passage 18 in cover plate 13. A valve-seat member 21 has an outer annular flange 22 which rests on the upper end of nut 19, member 21 being held in place by the flanged clamping nut 23 screwed on the upper threaded portion of nut 19. The valve seat member 21 is formed with a central valve passage 24 having a lower conical valve-engaging seat 25. A plurality of interchangeable valve seat members 21, 21$^a$, 21$^b$ and 21$^c$ are shown in Figs. 5 to 8 inclusive. One of these valve seats will be selected in accordance with the maximum steam pressure used in the system, as will be hereinafter described more in detail.

The movable valve assembly (see Fig. 4) comprises a valve holder 26 provided with a plurality of vertical guide ribs 27 slidably engaging in passage 20 in nut 19, so that the holder is guided for vertical movement without interfering with the passage of fluid around the valve holder. The valve member 28 having a conical upper end portion 29 to engage the valve seat 25 is mounted somewhat loosely in holder 26 by means of pin 30, sufficient play being permitted the valve member 28 to assure proper seating of the valve member. The valve member 28 is provided with a conical lower end 31 similar to the upper end 29 so that this member is reversible. The lower portion of valve holder 26 is internally threaded at 32 to receive the upper end of valve stem 33 which is secured in place by lock nut 34.

The discharge tube 35 has an upper flanged portion 36 secured to the under side of cover plate 13 by screw bolts 37 and nuts 38. The passage 39 in tube 35 extends downwardly in prolongation of the threaded passage 18 in the cover plate 13. An integral guide and supporting bracket 40 projects laterally from one side of tube 35. The bucket 7 previously referred to is closed at its lower end so as to be floated by the water which accumulates at 41 in the lower portion of casing 1, the bucket being open at its upper end so that the water in casing 1 will overflow into the bucket when a sufficient quantity of water has accumulated. A guide rod 42 is secured centrally in the bottom of bucket 7 by means of nuts 43 screwed on the threaded lower end of the rod, this guide rod extending up through guide passages 44 in bracket 40 so as to keep the bucket 7 centered within casing 1 and guided during its vertical movements. An operating lever or link 45 has one end 46 pivoted at 47 between a pair of ears 48 extending downwardly from the lower end of discharge tube 35. The other forked end portion 49 of lever 45 is pivoted at 50 to the upper end of a post or pedestal 51 having a threaded lower end 52 secured by nut 52$^a$ in the bottom of bucket 7.

A valve stem clevis 53 has a forked lower portion forming side members 54 which project down at either side of lever 45 and are pivotally connected with the lever by pintle 55. The side arms 54 on the clevis are connected by two upper bridge portions 56 and 57. Bridge 56 is threaded to receive the lower end 58 of valve stem 33 which is locked in place by nut 59.

In the normal operation of the trap as thus far described, the buoyancy of bucket 7 which is supported by the water 41 within casing 1 will be exerted upwardly through post 51, lever 45, clevis 53 and valve stem 33 to hold the movable valve member 28 against the valve seat 25 and thus close the outlet passage to prevent the escape of steam through the trap. The condensate 41 will gradually accumulate within casing 1 until a sufficient quantity is trapped within the casing to overflow into bucket 7. This will reduce the buoyancy of bucket 7 and increase its weight so that it will eventually fall, and through the link and lever connections previously described will move the valve member 28 downwardly to open the valve passage. As the bucket 7 falls a greater quantity of the liquid 41 will overflow into the bucket. Since the fluids within casing 1 are under higher pressure than exists in the outlet passage, the pressure on the liquid in bucket 7 will force this liquid upwardly through the passage 39 in discharge tube 35 and thence out through the valve passages, valve chamber 15 and discharge passage 9 and thence through outlet pipe 12. When the weight of the bucket and its contents have been sufficiently reduced by this removal of the water within the bucket, the bucket will again rise due to the buoyant effect of the water 41 on which the bucket rests, and the valve will again be closed to cut off the outlet passage and prevent the loss of steam. The above described operation is much the same as in other bucket traps of this type as heretofore known.

A lever 60 is pivoted at 61 between a pair of ears 62 projecting downwardly from bracket 40. The long arm 63 of this lever bears at 64 on the bridge member 57 of clevis 53. A compression spring 65 is confined within a pocket 66 in bracket 40 and bears at its lower end on arm 63 of lever 60 so as to force this arm of the lever downwardly, and thus through clevis 53 and valve stem 33 holds the valve open. Spring 65 is sufficiently powerful to force the parts downwardly and hold the valve open (as indicated in dotted lines Fig. 1) in opposition to the buoyant effect of bucket 7.

The thermostatic mechanism comprises an expansion rod 67 of a suitable metal threaded at its upper end 68 into an opening in the lower face of closure plate 13 and locked in place by nut 69. The rod 67 may be provided with a pair of flat sides 70 to facilitate screwing rod 67 into place to obtain the proper adjustment. The lower portion of rod 67 is guided through a passage 71 in bracket 40 and the lower end 72 of the rod bears upon the short arm 73 of lever 60. The rod 67 is formed of a suitably selected metal having a greater coefficient of expansion than the metal of which the casing and other elements of the apparatus are formed. When rod 67 is cold, or at a temperature substantially less than the temperature of steam, it will be of insufficient length to interfere with the downward swinging movement of lever 60 by means of spring 65 to hold the valve in open position. However, when steam has entered the casing 1 and the rod 67 has expanded by being subjected to steam temperature, the lower end 72 of rod 67 will press downwardly on the short end 73 of lever 60 and swing this lever upwardly to the position shown in solid lines in Fig. 1 thus compressing the spring 65. The bucket 7 will now be permitted to move upwardly due to its buoyancy so as to move the valve up to closed position. As long as steam or vapors at substantially steam temperature fill the space above the liquid in casing 1, the rod 67 will be expanded so as to hold lever 60 in the full line position of Fig. 1, and the bucket trap will operate in its normal manner entirely under the control of the bucket 7. If the use of the system is discontinued for a certain period so that the temperature of the gases in casing 1 falls materially below steam temperature, the rod 67 will contract and permit spring 65, through the connections already described, to open the valve and the valve will remain open while the equipment is out of service. When the heating system is again put into service considerable air may have accumulated in the system, but this air can be forced out ahead of the steam and condensate since the trap valve is open. The valve will remain open until all of the gases and condensate ahead of the steam have been forced out of the heating system and steam has entered the casing 1. The relatively hot steam will then cause rod 67 to expand and permit the bucket trap to assume its normal operation so that the relatively high pressure steam will be confined within the system but condensate is forced out at suitable intervals. The entire operation is automatic and needs no attention after the parts have once been installed and suitably adjusted. Proper adjustment of the thermostatic rod 67 is obtained by screwing more or less of the rod into cover plate 13 at 68.

A passage 74 connects the upper portion of outlet passage 39 in tube 35 with the upper portion of the space or chamber within casing 1 so as to equalize the vapor pressures within these two spaces and permit the gases to flow directly through passage 74 without being forced through the liquid in bucket 7.

It will be apparent that the power available for operating the trap to open the valve (due to the buoyancy of bucket 7 and the leverage connections) is substantially constant. The force which opposes this opening is determined by the pressure difference between the steam or fluids within the trap and atmospheric pressure (or the pressure existing in the outside discharge passage) multiplied by the area of the valve seat opening. It will be apparent that this opposing force may be maintained constant for different maximum steam pressures within the trap, by varying the area of the valve seat opening. It is furthermore desirable that the movable valve member shall always occupy the same closed position, that is that it always be elevated to the same position when the valve is closed. For this reason a plurality of interchangeable valve seat members are provided, examples of which are shown in Figs. 5, 6, 7 and 8. It will be apparent from these views that the movable valve member 28 is raised to exactly the same position in order to contact with the valve seat surface 25 in each of these valve seat members, although a valve passage of different area is provided in each of the members. This is accomplished by positioning the conical valve engaging surface 25 of the valve seat lower for the larger valve opening (see Fig. 8) so as to contact a larger portion of the conical surface 29 of movable valve member 28, and positioning this valve seat surface 25 higher with the valve opening of smaller area so as to contact a smaller upper portion of the conical valve member (see Fig. 5). When the parts of the bucket trap have been adjusted for proper operation with one maximum steam pressure, the trap may be immediately converted for use with a different steam pressure, without additional adjustment, by merely substituting a different valve seat member 21.

Figure 9:
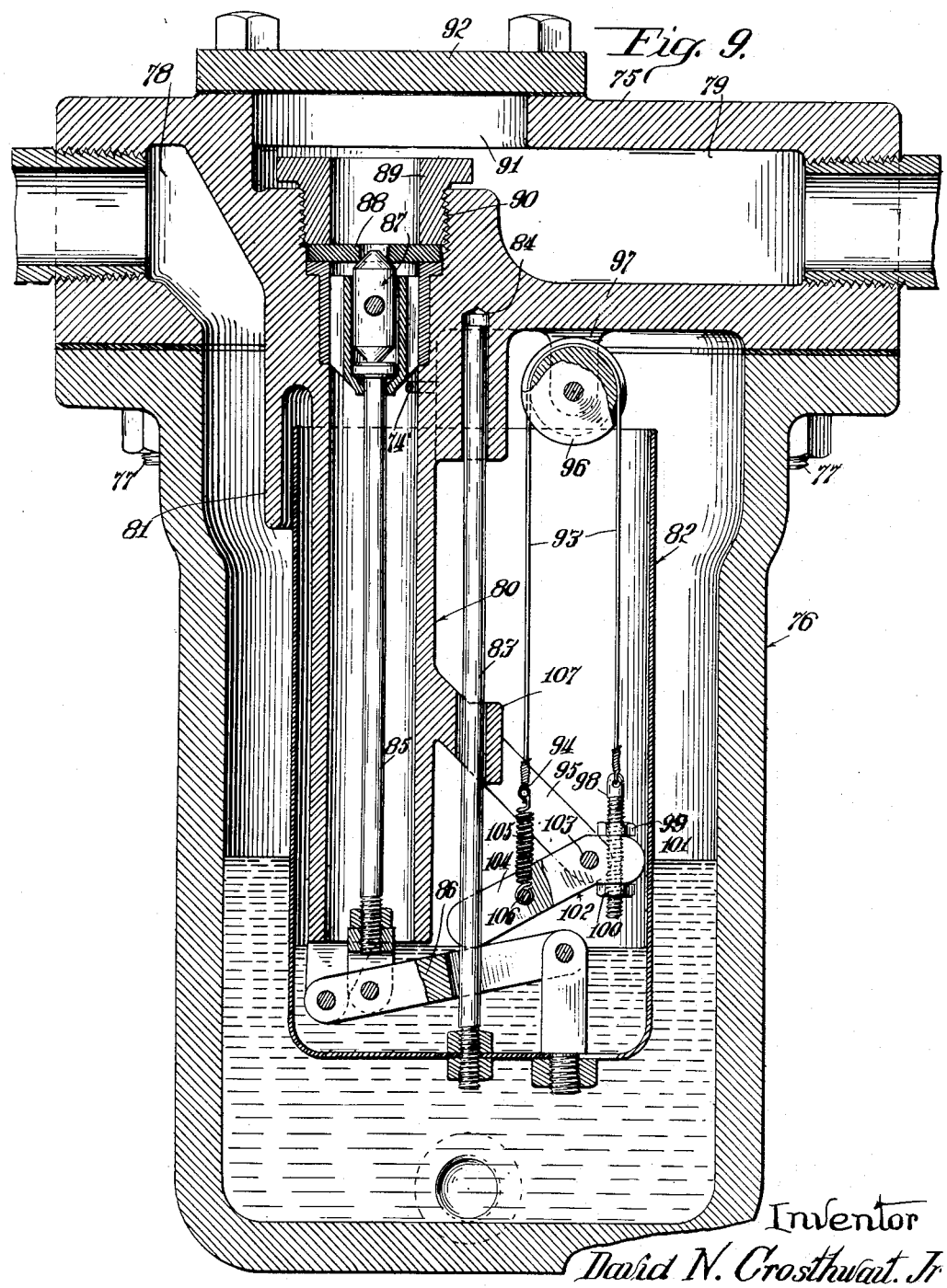
Fig. 9 is a vertical section, similar to Fig. 1, showing a modified form of trap.

A modified and somewhat simplified form of bucket trap involving the improvements of this invention is shown in Fig. 9. In this form of the invention, a removable closure or head 75 secured to the casing 76 by bolts 77 houses both the inlet passage 78 and the discharge passage 79. The discharge tube 80 extends integrally downward from head 75, as does also the baffle 81. A passage 74', similar to passage 74 previously described, serves to equalize the vapor pressures inside and outside of tube 80. The bucket 82 is provided with a guide rod 83 extending through a guide passage 107 in bracket arm 95 and into a guide passage 84 formed in head 75 and is connected with valve stem 85 through a lever mechanism 86 similar to that disclosed in the first form of the invention. The movable valve assembly 87 may be substantially the same as the one already described, and interchangeable valve seats 88 are held in place by a ring nut 89 screwed into a passage 90 in hand 75, access to this mechanism being permitted through opening 91 normally closed by the removable closure plate 92. The normal operation of this trap under control of the bucket 82 is essentially the same as in the first described form of the invention. In this form of the invention, the thermostatic element comprises a flexible wire or ribbon 93 of suitable thermostatic metal, this flexible member being anchored at one end 94 to an arm 95 extending laterally downward from discharge tube 80. Flexible member 93 extends upwardly over a pulley 96 journaled between ears 97 on head 75 and the other end of the member is secured to a threaded rod or pin 98 adjustably secured by means of nuts 99 and 100 in the short arm 101 of a lever 102 fulcrumed at 103 in arm 95. The long arm 104 of this lever bears on operating lever 86. A contractile spring 105 is anchored at one end 94 to arm 95 and at the other end 106 to the arm 104 of lever 102. It will be noted that the actions of the thermostatic element and the spring are reversed in this form of the invention, the spring 105 tending to swing the lever 102 upwardly so as not to interfere with the normal closing of the valve by means of the buoyancy of bucket 82. However, when the thermostatic element 93 is sold or at temperatures lower than steam temperature, it will contract so as to pull upwardly on the short arm 101 of lever 102 and swing the long arm 104 downwardly so as to positively move the valve to open position. When steam has entered the casing 76, element 93 will expand so as to permit spring 105 to raise the lever 102 and the valve will again be placed under the entire control of bucket 82.

I claim:

1. A steam trap comprising a casing into which fluids are delivered, an outlet through which fluids are discharged from the casing, a valve for closing the outlet, and mechanism operated by the accumulated liquid in the casing for normally holding the valve closed and for opening the valve when a sufficient quantity of liquid has accumulated in the casing, said valve comprising a movable valve member having a conical end portion for engaging the valve seat, and a plurality of interchangeable valve seats provided with conical openings of different sizes for use with different steam pressures within the casing, the valve seats being so proportioned that the movable valve member will always move to the same closed position to engage any one of the valve seats.

2. A steam trap comprising a casing into which fluids are delivered, an outlet through which fluids are discharged from the casing, a valve for closing the outlet, and mechanism operated by the accumulated liquid in the casing for normally holding the valve closed and for opening the valve when a sufficient quantity of liquid has accumulated in the casing, said valve comprising a movable valve member having a conical end portion for engaging the valve seat, and a plurality of interchangeable valve seats for use with different steam pressures within the casing, each valve seat comprising an outer flange portion for supporting the seat and an inner valve opening formed with a conical inlet for engagement by the movable valve member, the supporting flange and conical inlet being so relatively positioned in the several valve seats, that the movable valve member will always move to the same closed position to engage any one of the seats.

3. A steam trap comprising a casing into which fluids are delivered, an outlet in the upper portion of the casing through which fluids are discharged from the casing, a valve for closing the outlet comprising a fixed valve seat and a movable valve member, a bucket within the casing adapted to be floated by the accumulated liquid therein, a fixed discharge tube extending downwardly within the bucket from the outlet valve, a valve stem carrying the movable valve member at its upper end and projecting downwardly through the tube, link connections between the tube, valve stem and bucket whereby upward movement of the bucket holds the valve closed and downward movement of the bucket opens the valve, an expansible metallic thermostat positioned within the casing, a lever fulcrumed within the casing and adapted to bear at one end on a portion of said link mechanism to hold the valve open, the thermostat being adapted to swing the lever in one direction, and a spring positioned to move the lever in the other direction.

4. A steam trap comprising a casing into which fluids are delivered, an outlet in the upper portion of the casing through which fluids are discharged from the casing, a valve for closing the outlet comprising a fixed valve seat and a movable valve member, a bucket within the casing adapted to be floated by the accumulated liquid therein, a fixed discharge tube extending downwardly within the bucket from the outlet valve, a valve stem carrying the movable valve member at its upper end and projecting downwardly through the tube, link connections between the tube, valve stem and bucket whereby upward movement of the bucket holds the valve closed and downward movement of the bucket opens the valve, a lever fulcrumed within the casing and bearing at one end on the link mechanism, a spring positioned to swing the lever so as to hold the valve open, and a metallic thermostatic rod positioned within the casing and engaging the lever to swing the lever against the force of the spring and permit the valve to close when the thermostatic rod is subject to steam temperatures.

5. A steam trap comprising a casing into which fluids are delivered, an outlet in the upper portion of the casing through which fluids are discharged from the casing, a valve for closing the outlet comprising a fixed valve seat and a movable valve member, a bucket within the casing adapted to be floated by the accumulated liquid therein, a fixed discharge tube extending downwardly within the bucket from the outlet valve, a valve stem carrying the movable valve member at its upper end and projecting downwardly through the tube, link connections between the tube, valve stem and bucket whereby upward movement of the bucket holds the valve closed and downward movement of the bucket opens the valve, a lever fulcrumed within the casing and bearing at one end on the link mechanism, a spring positioned to swing the lever away from the link mechanism to permit the valve to close, and a flexible thermostatic member connected with the lever and adapted to draw the lever into engagement with the link mechanism to hold the valve open when the thermostatic member is subject to temperatures below steam temperature.

DAVID N. CROSTHWAIT, JR.